US012722452B2

(12) United States Patent
Tanaka

(10) Patent No.: US 12,722,452 B2
(45) Date of Patent: Sep. 1, 2026

(54) VEHICLE AIR CONDITIONING CONTROL SYSTEM

(71) Applicant: SUBARU CORPORATION, Tokyo (JP)

(72) Inventor: Yasufumi Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 847 days.

(21) Appl. No.: 18/178,083

(22) Filed: Mar. 3, 2023

(65) Prior Publication Data

US 2023/0302876 A1 Sep. 28, 2023

(30) Foreign Application Priority Data

Mar. 23, 2022 (JP) ................................ 2022-046222

(51) Int. Cl.
*B60H 1/22* (2006.01)
*B60H 1/00* (2006.01)

(52) U.S. Cl.
CPC ....... *B60H 1/2218* (2013.01); *B60H 1/00271* (2013.01); *B60H 1/00764* (2013.01)

(58) Field of Classification Search
CPC .. B60H 1/2218; B60H 1/0027; B60H 1/0076; B60H 1/004
See application file for complete search history.

(56) References Cited

U.S. PATENT DOCUMENTS

2015/0191179 A1 7/2015 Teraya
2020/0108820 A1* 4/2020 Shin .................... B60H 1/2218

FOREIGN PATENT DOCUMENTS

JP 2013-095267 A 5/2013
JP 2015-058742 A 3/2015
JP 2015-128936 A 7/2015
KR 20050028734 * 3/2005 ............... H02K 9/06
KR 20160086567 A * 7/2016 ......... B60H 1/00271

OTHER PUBLICATIONS

Notice of Reasons for Refusal received in corresponding Japanese Patent Application No. 2022-046222, dated Oct. 28, 2025.

* cited by examiner

*Primary Examiner* — Nathaniel E Wiehe
*Assistant Examiner* — Daniel S Collins
(74) *Attorney, Agent, or Firm* — Rimon P.C.

(57) ABSTRACT

A vehicle air conditioning control system includes an electric heater, a direct-current-to-direct-current converter, an engine system temperature sensor, and a controller. The electric heater applies heat to an air conditioning airflow. The direct-current-to-direct-current converter converts a voltage of electric power of an in-vehicle battery. The engine system temperature sensor measures a temperature of one or each of an engine and a related member. The controller controls an operating state of the electric heater based on the temperature. Upon determining, based on the temperature, that the electric heater is to operate, the controller performs a control of switching the operating state between: an operating state where the electric heater is turned on and the direct-current-to-direct-current converter is caused to output a short-time current; and an operating state where the electric heater is turned off and the direct-current-to-direct-current converter is caused to output a steady-state current.

18 Claims, 8 Drawing Sheets

VEHICLE AIR CONDITIONING CONTROL SYSTEM

CROSS-REFERENCE TO RELATED APPLICATIONS

The present application claims priority from Japanese Patent Application No. 2022-046222 filed on Mar. 23, 2022, the entire contents of which are hereby incorporated by reference.

BACKGROUND

The disclosure relates to a vehicle air conditioning control system.

In a vehicle such as a hybrid electric vehicle that travels using both an engine and a motor, for example, upon starting of the engine or in a case where the engine is stopped while the vehicle is traveling using the motor, heat of the engine is not usable for heating a space in a vehicle compartment.

To address this, a technique of using a positive temperature coefficient (PTC) heater as a heat source for heating in such a case is known. For example, reference is made to Japanese Unexamined Patent Application Publication No. 2015-058742.

SUMMARY

An aspect of the disclosure provides a vehicle air conditioning control system that includes an electric heater, a direct-current-to-direct-current converter, an engine system temperature sensor, and a controller. The electric heater is configured to apply heat to an air conditioning airflow to be blown out into a space in a vehicle compartment. The direct-current-to-direct-current converter is configured to convert a voltage of electric power of an in-vehicle battery into a predetermined voltage. The engine system temperature sensor is configured to measure a temperature of one or each of an engine and a member related to the engine. The controller is configured to control an operating state of the electric heater based on the temperature measured by the engine system temperature sensor. The direct-current-to-direct-current converter is configured to output a current that is switchable between a steady-state current and a short-time current. The short-time current has a current value higher than a current value of the steady-state current and is outputtable for a predetermined time period or less. The controller is configured to, upon determining, based on the temperature, that the electric heater is to operate, perform a control of switching the operating state between a first operating state and a second operating state. The first operating state is an operating state in which the electric heater is turned on and the direct-current-to-direct-current converter is caused to output the short-time current. The second operating state is an operating state in which the electric heater is turned off and the direct-current-to-direct-current converter is caused to output the steady-state current.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
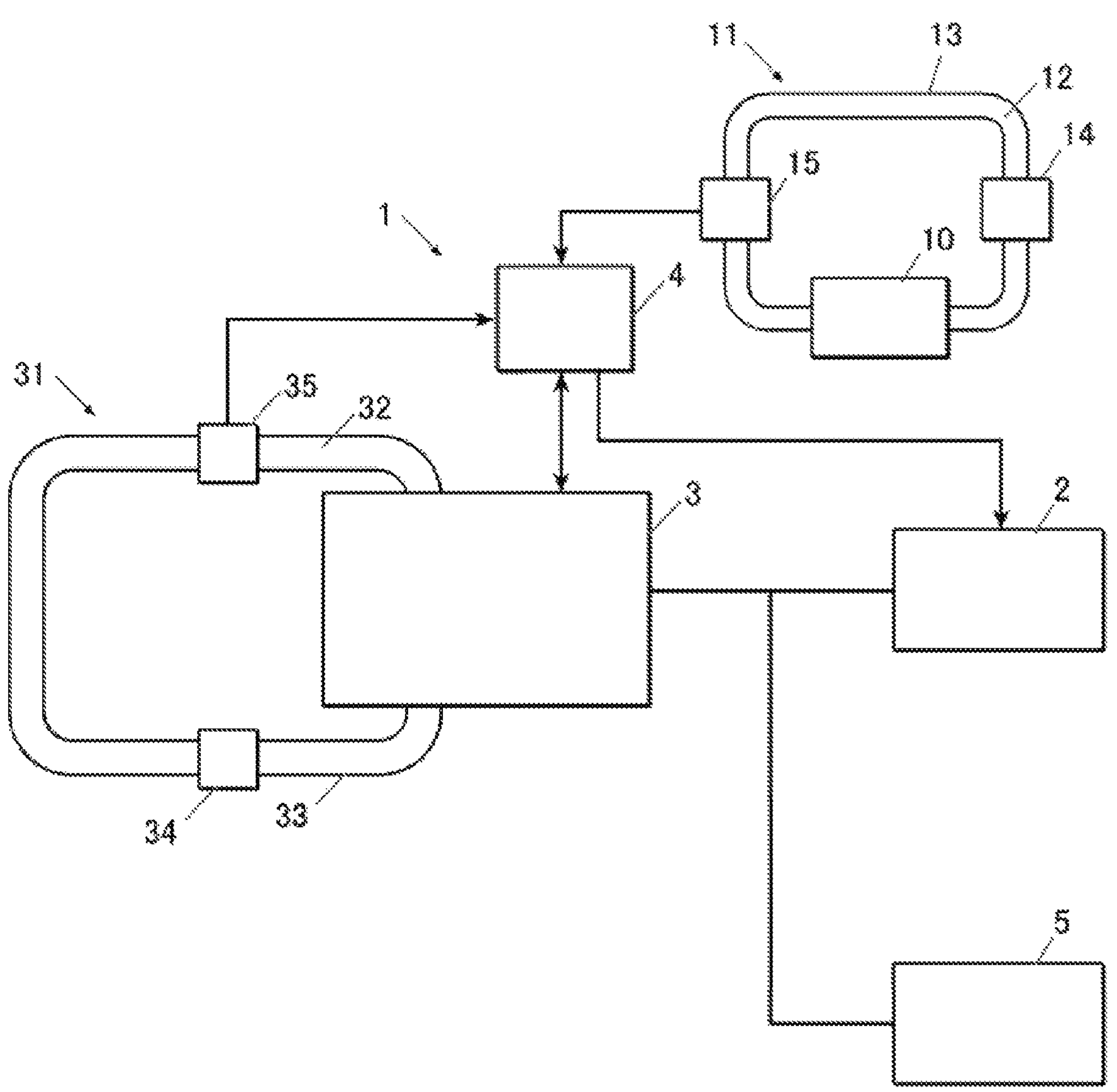
FIG. 1 is a schematic diagram illustrating a configuration of a vehicle air conditioning control system according to one example embodiment of the disclosure.

In a vehicle such as a hybrid electric vehicle, a direct-current voltage of a high-voltage battery may be converted to a lower direct-current voltage by a direct-current-to-direct-current (DC/DC) converter and the lower direct-current voltage may be supplied to an electric load such as any of various electric control units (ECUs) or air conditioning equipment.

However, because a PTC heater consumes a lot of electric power, the DC/DC converter is to supply a great electric current to the PTC heater. This can result in an increase in size or cost of the DC/DC converter.

It is desirable to provide a vehicle air conditioning control system that is able to heat a space in a vehicle compartment by causing an electric heater such as a PTC heater to operate without increasing the size or the cost of a DC/DC converter.

In the following, vehicle air conditioning control systems according to some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Each of the vehicle air conditioning control systems according to the example embodiments of the disclosure may be mounted on a vehicle such as a hybrid electric vehicle. Each of the vehicle air conditioning control systems according to the example embodiments may be configured to increase the temperature of an air conditioning airflow by assisting, with use of an electric heater, heating by air conditioning equipment already provided in a vehicle, in a case where an occupant performs an operation to start the heating while the temperature of an engine is still low. For example, the temperature of the engine may be low upon starting of the engine.

The following description refers to an example related to the starting of the engine. However, the description is similarly applicable to, for example, the following cases: a case where the engine is stopped while the vehicle travels using a motor; and a case where the engine is started in such a condition, i.e., a case where traveling is switched from traveling using the motor to traveling using the engine.

In the following, a description is given of the respective vehicle air conditioning control systems according to some example embodiment of the disclosure.

First Example Embodiment

Now, a description is given of the principles of a way of controlling the vehicle air conditioning control systems according to the respective example embodiments of the disclosure. FIG. 1 is a schematic diagram illustrating a configuration of a vehicle air conditioning control system 1 according to a first example embodiment.

The vehicle air conditioning control system 1 includes an electric heater 2, a DC/DC converter 3, and a controller 4.

For example, the electric heater 2 may be a PTC heater; however, this is non-limiting. The electric heater 2 may be a heater of any other type.

The electric heater 2 may be disposed, for example, near a fan or an air sending path of unillustrated air conditioning equipment. The air conditioning equipment may heat a space in a vehicle compartment by heating the taken-in air with exhaust heat from an engine 10 and sending the heated air into the space in the vehicle compartment. The electric heater 2 may be configured to apply heat to an air conditioning airflow blown out from the air conditioning equipment into the space in the vehicle compartment.

The DC/DC converter 3 may convert a direct-current voltage of an unillustrated high-voltage battery to a predetermined lower direct-current voltage. The high-voltage battery may be mounted in the vehicle. The direct-current voltage of the high-voltage battery may be 24 V or 36 V, for example. The predetermined lower direct-current voltage may be 12 V, for example.

The DC/DC converter 3 may supply the predetermined direct-current voltage that has been subjected to the conversion to the electric heater 2 and another electric load 5 such as any of various ECUs or the air conditioning equipment.

The DC/DC converter 3 may substantially constantly supply the controller 4 with information regarding a value of a current which the DC/DC converter 3 is outputting.

The DC/DC converter 3 may be configured to output a direct-current current that is switchable between a steady-state current and a short-time current. The steady-state current may be a current that is less than or equal to a rated current. The short-time current may be a current that is less than or equal to a rated short-time current. The short-time current may have a current value that is greater than the current value of the steady-state current and may be outputtable for a predetermined time period $\Delta t1$ or less.

The DC/DC converter 3 may be provided with a flow path 33 for a coolant 32 as a converter cooling system 31. The converter cooling system 31 may be configured to cool the DC/DC converter 3.

To distinguish between the coolant 32 for the DC/DC converter 3 and a coolant 12 for the engine 10 which will be described later, the coolant 32 for the DC/DC converter 3 is hereinafter referred to as a "converter coolant 32", and the coolant 12 for the engine 10 is hereinafter referred to as an "engine coolant 12".

The flow path 33 may be provided with a pump 34 configured to cause the converter coolant 32 to flow through the flow path 33.

The flow path 33 may also be provided with a converter system temperature sensor 35. The converter system temperature sensor 35 may measure a temperature $T_{32}$ of the converter coolant 32 in the flow path 33. The converter coolant 32 may be a member related to cooling of the DC/DC converter 3. This will be described later.

The engine 10 may be provided with a flow path 13 for the engine coolant 12 as an engine cooling system 11. The engine cooling system 11 may be configured to cool the engine 10.

The flow path 13 may be provided with a pump 14 and an engine system temperature sensor 15. The pump 14 may be configured to cause the engine coolant 12 to flow through the flow path 13. The engine system temperature sensor 15 may measure a temperature $T_{12}$ of the engine coolant 12 in the flow path 13.

Thus, in the first example embodiment, the engine system temperature sensor 15 may measure the temperature $T_{12}$ of the engine coolant 12. In one embodiment, the engine coolant 12 may serve as a "member related to the engine". Alternatively, the engine system temperature sensor 15 may measure, for example, one or more of the temperature of the engine coolant 12, the temperature of the engine 10, and the temperature of an unillustrated engine compartment.

The engine system temperature sensor 15 may supply the controller 4 with information regarding the measured temperature $T_{12}$ of the engine coolant 12.

The controller 4 may include an ECU.

In this case, the controller 4 may include an ECU as a single unit. Alternatively, the controller 4 may be included in an ECU of a power supply system including the DC/DC converter 3, or may be included in an ECU for the air conditioning equipment.

The controller 4 may control an operating state of the electric heater 2 on the basis of the temperature $T_{12}$ of the engine coolant 12 measured by the engine system temperature sensor 15.

If the temperature $T_{12}$ of the engine coolant 12 is higher than or equal to a predetermined temperature $T_{12th}$ and is therefore warm enough, the engine 10 may also be warm enough. It is therefore possible to perform sufficient heating by the air conditioning equipment already provided in the vehicle without causing the vehicle air conditioning control system 1 according to the first example embodiment to operate.

For such a reason, the controller 4 may determine that the electric heater 2 is not to operate in a case where the temperature $T_{12}$ of the engine coolant 12 measured by the engine system temperature sensor 15 is higher than or equal to the predetermined temperature $T_{12th}$.

In addition, in a case where the temperature $T_{12}$ of the engine coolant 12 measured by the engine system temperature sensor 15 reaches the predetermined temperature $T_{12th}$ as described above after the controller 4 starts the control of the operating state of the electric heater 2 described below, the controller 4 may stop the control at the timing when the temperature $T_{12}$ of the engine coolant 12 measured by the engine system temperature sensor 15 reaches the predetermined temperature $T_{12th}$. One reason for this is that the air conditioning equipment already provided in the vehicle is able to perform sufficient heating and it is not necessary to assist the heating by causing the electric heater 2 to operate.

In contrast, in a case where the temperature $T_{12}$ of the engine coolant 12 measured by the engine system temperature sensor 15 is lower than the predetermined temperature $T_{12th}$, the controller 4 may determine that the electric heater 2 is to operate.

In a case where the electric heater 2 is determined as being to operate, the controller 4 may control the electric heater 2 and perform a control of switching the operating state of the electric heater 2 and an operating state of the DC/DC converter 3.

That is, the controller 4 may perform a control of switching an operating state between a first operating state and a second operating state. The first operating state may be an operating state in which the electric heater 2 is turned on and the DC/DC converter 3 is caused to output the short-time current. The second operating state may be an operating state in which the electric heater 2 is turned off and the DC/DC converter 3 is caused to output the steady-state current.

In the following, a detailed description is given of a way in which the controller 4 controls the operating state of the electric heater 2.

Figure 2:
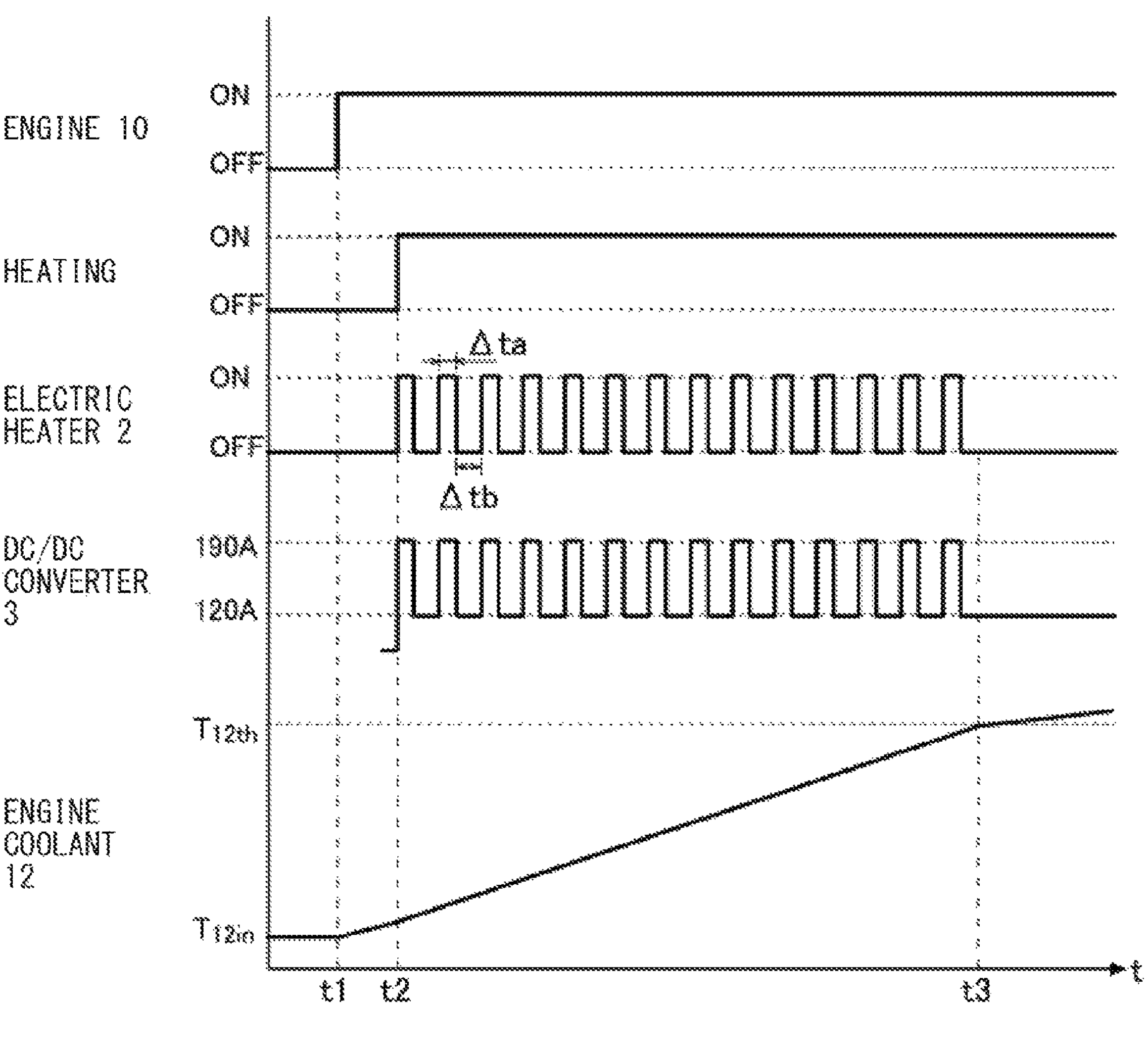
FIG. 2 is a timing chart for describing a way of controlling an operating state of an electric heater by a controller, etc.

As illustrated in FIG. 2, assume that the engine 10 is started at a time t1 (the engine 10: ON) and an operation for starting heating is performed by an occupant at a time t2 (heating: ON). It is to be noted that, in some cases, the operation for starting the heating may be performed before the engine 10 is started.

The controller 4 may determine whether the temperature $T_{12}$ of the engine coolant 12 measured by the engine system temperature sensor 15 is higher than or equal to the predetermined temperature $T_{12th}$ at a timing when the operation for starting the heating is performed, i.e., at the time t2. In the drawings, "$T_{12in}$" indicates an initial temperature of the engine coolant 12.

In the case illustrated in FIG. 2, the temperature $T_{12}$ is lower than the predetermined temperature $T_{12th}$. The controller 4 may therefore determine that the electric heater 2 is to operate.

The controller 4 may request the DC/DC converter 3 to supply information regarding the above-described predetermined time period Δt1 and a time period Δt2. The predetermined time period Δt1 may be a time period for which the short-time current is outputtable. The time period Δt2 may be a time period for which the steady-state current is to be outputted after the short-time current is outputted.

The DC/DC converter 3 may supply the controller 4 with the information regarding the time periods Δt1 and Δt2. It is to be noted that, in one example, the controller 4 may have information such as the information regarding the time periods Δt1 and Δt2 in advance. In this case, the controller 4 may not perform a process of requesting the DC/DC converter 3 to supply the information or the DC/DC converter 3 may not perform a process of, for example, supplying the information to the controller 4.

The controller 4 may repeatedly transmit, to the electric heater 2, a signal for turning on the electric heater 2 for a time period Δta and a signal for turning off the electric heater 2 for a time period Δtb. Hereinafter, the signal for turning on the electric heater 2 for the time period Δta is referred to as an "ON signal", and the signal for turning off the electric heater 2 for the time period Δtb is referred to as an "OFF signal".

The time period Δta for which the electric heater 2 is turned on may be substantially the same as the above-described predetermined time period Δt1, or may be set to be shorter than the predetermined time period Δt1. The time period Δtb for which the electric heater 2 is turned off may be substantially the same as the above-described predetermined time period Δt2, or may be set to be longer than the predetermined time period Δt2.

Upon receiving the ON signal from the controller 4, the electric heater 2 may start operating and the operating state of the electric heater 2 may be switched to an operating state to generate heat.

In a case where the electric heater 2 is turned on, the DC/DC converter 3 may change from an operating state of outputting the steady-state current to an operating state of outputting the short-time current. The short-time current may have a current value that is increased by a value of current consumed by the electric heater 2 in the on-state as compared with the current value of the steady-state current and is greater than the current value of the rated current.

Upon receiving the OFF signal from the controller 4, the operating state of the electric heater 2 may be switched to an operating state in which the operation is stopped.

The operating state of the DC/DC converter 3 may be switched from the operating state of outputting the short-time current to the operating state of outputting the steady-state current.

It is to be noted that FIG. 2 and FIG. 3 which will be described later illustrate a case where: a value of a current outputted from the DC/DC converter 3 to the other electric load 5 including the air conditioning equipment (see FIG. 1) is 120 A; a value of a current consumed by the electric heater 2 is 60 A; and the total current value is therefore 180 A.

In this case, the rated current and the rated short-time current of the DC/DC converter 3 may be, for example, 120 A and 190 A, respectively.

In such a manner, the controller 4 may control the electric heater 2 and perform the control of switching the operating state of the electric heater 2 and the operating state of the DC/DC converter 3.

The controller 4 may stop the above-described control at a timing (a time t3) when the temperature $T_{12}$ of the engine coolant 12 measured by the engine system temperature sensor 15 reaches the predetermined temperature $T_{12th}$.

With the above-described configuration, turning on of the electric heater 2 may cause the direct current outputted from the DC/DC converter 3 to be the short-time current. In addition, even if the current value of the direct current becomes a current value greater than the current value of the rated current, the electric heater 2 may be turned off after the elapse of the time period Δta.

In addition, the direct current outputted from the DC/DC converter 3 may become the steady-state current that is less than or equal to the rated current, and such a state may continue for the time period Δtb. The DC/DC converter 3 may be sufficiently cooled in the time period Δtb.

Thus, according to the vehicle air conditioning control system 1 of the first example embodiment, it is possible to use already-provided cooling equipment without increasing the scale of the converter cooling system 31 that is configured to cool the DC/DC converter 3, such as the flow path 33 or the pump 34 for the DC/DC converter 3.

Therefore, according to the vehicle air conditioning control system 1 of the first example embodiment of the disclosure, it is possible to perform heating of the space in the vehicle compartment by causing the electric heater 2 such as the PTC heater to operate, without increasing the size or the cost of the DC/DC converter 3. Such heating may be heating to assist heating by heating equipment.

In a case where the current value of the direct current outputted from the DC/DC converter 3 is less than or equal to the current value of the rated current even if the electric heater 2 is turned on, the DC/DC converter 3 may be sufficiently cooled by the converter coolant 32 without turning off the electric heater 2.

Therefore, the vehicle air conditioning control system 1 may be configured to leave the electric heater 2 in the on-state without performing the control of switching the state of the electric heater 2 between the on-state and the off-state as described above in such a case.

In a case where the state of the electric heater 2 is switched between the on-state and the off-state as described above, the temperature of an air conditioning airflow (a heating airflow) blown out into the space in the vehicle compartment may increase and decrease. This can make an occupant feel uncomfortable.

To address this, the switching of the state of the electric heater 2 between the on-state and the off-state may be repeated in short time intervals. This makes it possible to prevent the occupant from feeling the increase and the decrease in the temperature of the air conditioning airflow.

Second Example Embodiment

Next, a description is given of the vehicle air conditioning control system 1 according to a second example embodiment in which an influence of the temperature $T_{32}$ of the converter coolant 32 on efficiency of cooling the DC/DC converter 3 is taken into consideration.

In a case where the temperature $T_{32}$ of the converter coolant 32 is low enough, the efficiency of cooling the DC/DC converter 3 by the converter coolant 32 may be high after the DC/DC converter 3 outputs the short-time current and the operating state of the DC/DC converter 3 is thereafter switched to the operating state of outputting the steady-state current. Therefore, even if the time period for which the DC/DC converter 3 outputs the short-time current, i.e., the time period Δta for which the electric heater 2 is turned on, is increased, the DC/DC converter 3 may be cooled sufficiently thereafter.

However, the increase in the temperature $T_{32}$ of the converter coolant 32 may decrease the efficiency of cooling the DC/DC converter 3 by the converter coolant 32 after the DC/DC converter 3 outputs the short-time current and the operating state of the DC/DC converter 3 is switched to the operating state of outputting the steady-state current.

For such a reason, in a case where the temperature $T_{32}$ of the converter coolant 32 is high, the predetermined time period for which the DC/DC converter 3 outputs the short-time current, i.e., the time period Δta for which the electric heater 2 is turned on, may be to be reduced.

Accordingly, the controller 4 may change the time period Δta for which the electric heater 2 is turned on in accordance with the temperature $T_{32}$ of the converter coolant 32 measured by the converter system temperature sensor 35 illustrated in FIG. 1.

For example, in a case where the state of the electric heater 2 is repeatedly switched between the on-state and the off-state as described above and the DC/DC converter 3 repeatedly outputs the short-time current, the temperature $T_{32}$ of the converter coolant 32 may increase.

Figure 3:
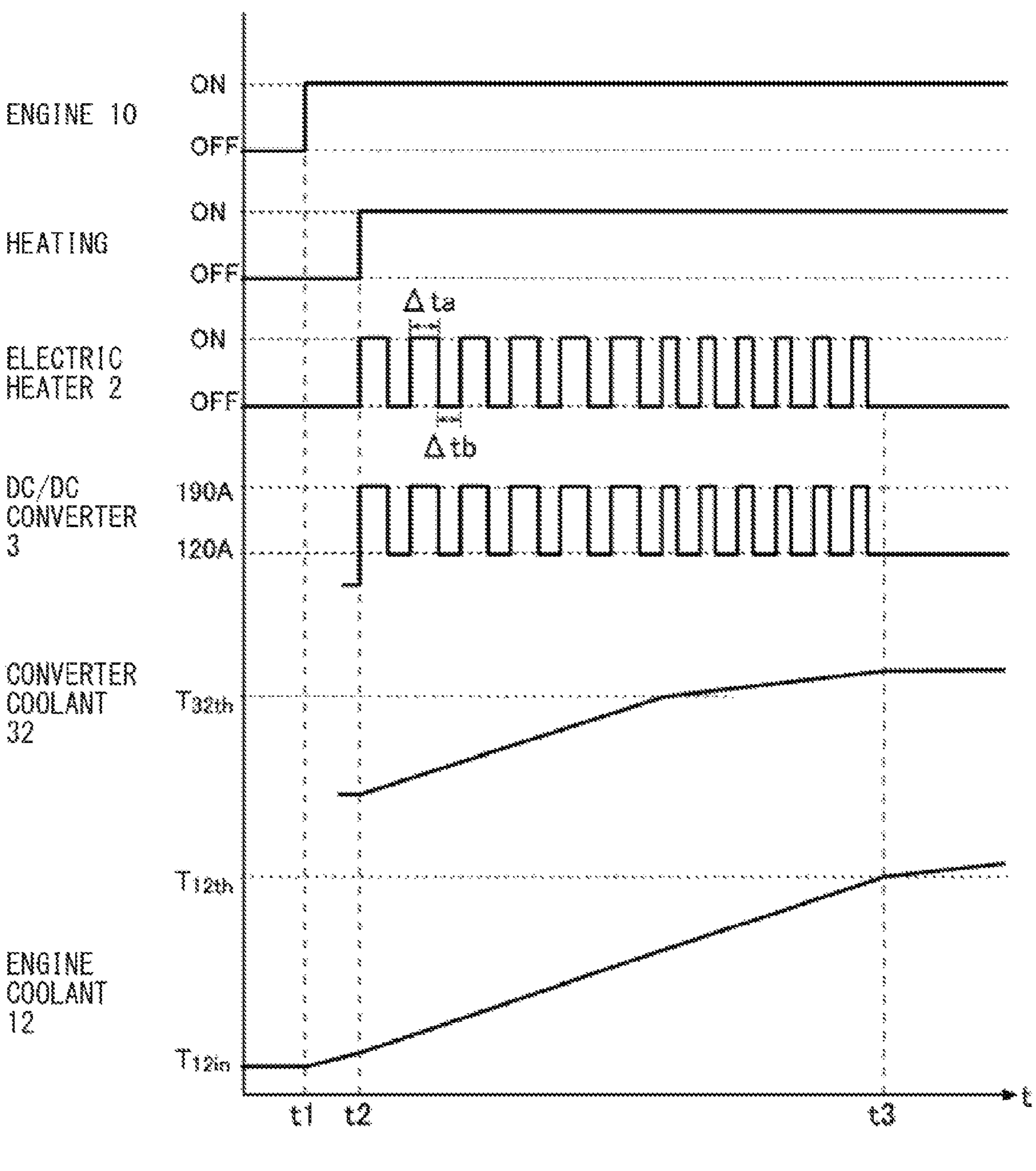
FIG. 3 is a timing chart for describing a way of controlling, etc. according to one example embodiment.

Accordingly, as illustrated in FIG. 3, for example, in a case where the temperature $T_{32}$ of the converter coolant 32 is low at the timing of starting the switching of the state of the electric heater 2 between the on-state and the off-state, the controller 4 may increase the time period Δta for which the electric heater 2 is turned on.

In addition, in a case where the temperature $T_{32}$ of the converter coolant 32 increases and reaches the predetermined temperature $T_{32th}$, the controller 4 may reduce the time period Δta for which the electric heater 2 is turned on.

With such a configuration, the time period Δta for which the electric heater 2 is turned on may be increased at least in a case where the temperature $T_{32}$ of the converter coolant 32 is low. This makes it possible to apply heat by the electric heater 2 to the airflow blown out from the air conditioning equipment into the space in the vehicle compartment for a longer time period.

It is thus possible to heat the air conditioning airflow by the electric heater 2 also in a case where the temperature of the engine 10 is low and the temperature of the air conditioning airflow blown out into the space in the vehicle compartment is low.

It is to be noted that, although the temperature $T_{32}$ of the converter coolant 32 is illustrated as increasing linearly in FIG. 3, actually, the temperature $T_{32}$ of the converter coolant 32 may repeatedly undergo a small increase and a small decrease in accordance with the on-state and the off-state of the electric heater 2. This is similarly applicable to FIG. 4 and the like which will be described later.

In one example, instead of changing the time period Δta for which the electric heater 2 is turned on, the time period ΔTb for which the electric heater 2 is turned off, i.e., the time period for which the steady-state current is outputted after the short-time current is outputted, may be changed. In this case, a control may be performed to increase the time period ΔTb for which the electric heater 2 is turned off, in accordance with an increase in the temperature $T_{32}$ of the converter coolant 32.

Third Example Embodiment

As the electric heater 2, an electric heater configured to have a switchable heat application intensity may be used. For example, the heat application intensity may be switched among a high level, a medium level, and a low level.

In addition, the controller 4 may perform switching of the state of the electric heater 2 described above between the on-state and the off-state and also perform switching of the heat application intensity of the electric heater 2.

In this case, if the heat application intensity of the electric heater 2 is at the low level, the value of the current consumed by the electric heater 2 may be small. However, in accordance with an increase in the heat application intensity from the low level to the medium level and then to the high level, the value of the current consumed by the electric heater 2 can be greater in some cases.

In addition, as described above, the efficiency of cooling the DC/DC converter 3 by the converter coolant 32 may increase in accordance with a decrease in the temperature $T_{32}$ of the converter coolant 32.

Figure 4:
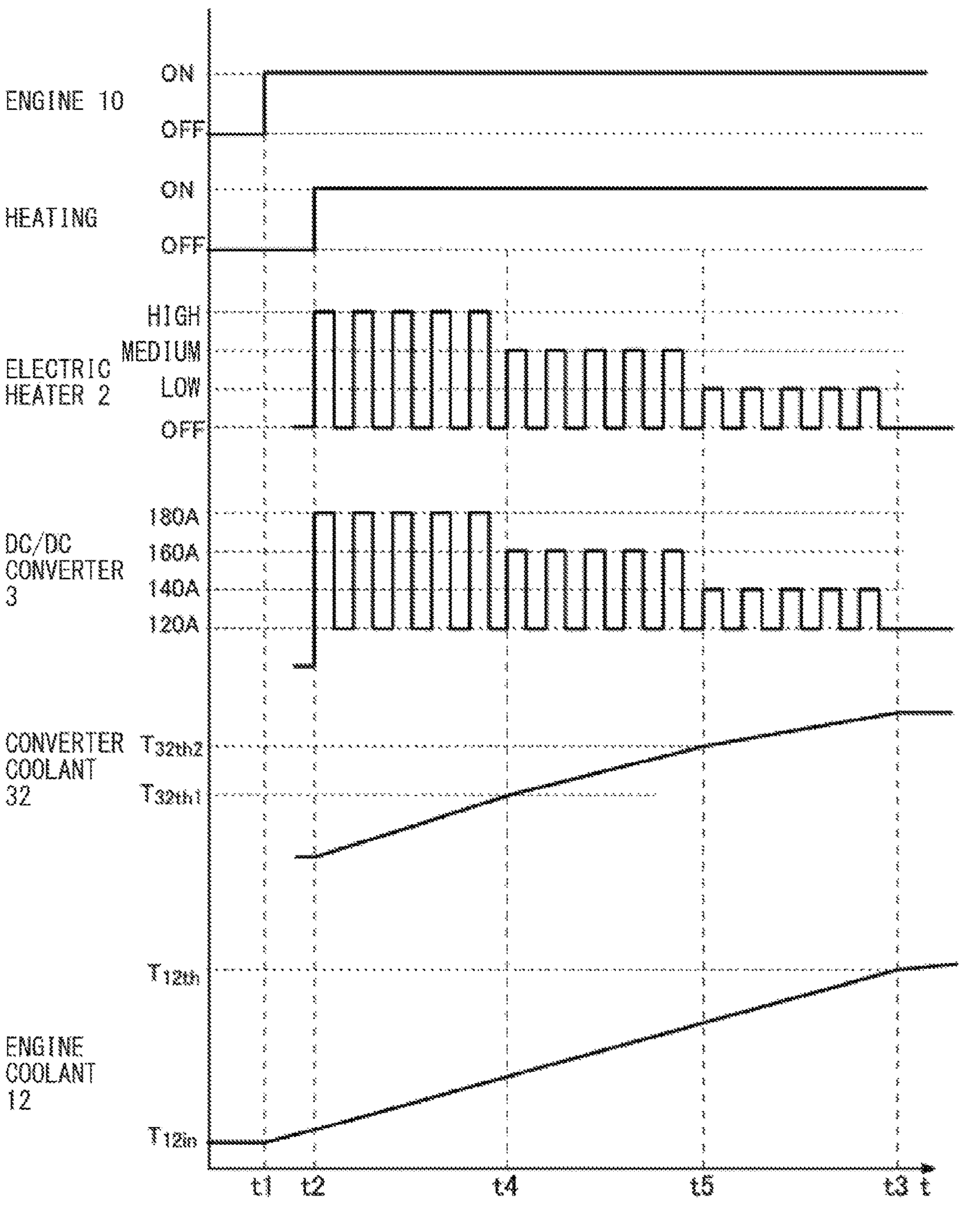
FIG. 4 is a timing chart for describing a way of controlling, etc. according to one example embodiment.

As illustrated in FIG. 4, in a case where the temperature $T_{32}$ of the converter coolant 32 measured by the converter system temperature sensor 35 is low, the controller 4 may increase the heat application intensity of the electric heater 2 for the on-state.

In addition, at a timing (a time t4) when the temperature $T_{32}$ of the converter coolant 32 increases and reaches the predetermined temperature $T_{32th1}$, the controller 4 may change the heat application intensity of the electric heater 2 for the on-state from the high level to the medium level.

At a timing (a time t5) when the temperature $T_{32}$ of the converter coolant 32 further increases and reaches the predetermined temperature $T_{32th2}$, the controller 4 may change the heat application intensity of the electric heater 2 for the on-state from the medium level to the low level.

The controller 4 may perform the switching of the state of the electric heater 2 between the on-state and the off-state while switching the heat application intensity in the above-described manner.

With such a configuration, the heat application intensity of the electric heater 2 may increase at least in a case where the temperature $T_{32}$ of the converter coolant 32 is low. This makes it possible to apply heat to the air conditioning airflow blown out from the air conditioning equipment into the space in the vehicle compartment by the electric heater 2 at a higher temperature.

It is thus possible to efficiently heat the air conditioning airflow by the electric heater 2 even in a case where the temperature of the engine 10 is low and the temperature of the air conditioning airflow blown out into the space in the vehicle compartment is low.

It is to be noted that FIG. 4 and FIG. 5 and the like which will be described later each illustrate an example where the values of the consumed currents are 60 A, 40 A, and 20 A in cases where the heat application intensities of the electric heater 2 are at the high level, the medium level, and the low level, respectively.

Although described above is a case where the heat application intensity of the electric heater 2 is switched in order of the high level, the medium level, and the low level, this is non-limiting. Alternatively, the heat application intensity of the electric heater 2 may be switched in order of the high level and the low level, in order of the medium level and the low level, or in order of the high level and the medium level.

In the following, a description is given of a case where the switching of the heat application intensity of the electric heater 2 and the switching of the state of the electric heater 2 between the on-state and the off-state are performed, as with in the third example embodiment. However, in one example, the control of changing the time period $\Delta ta$ for which the electric heater 2 is turned on, etc., which has been described referring to the second example embodiment, may also be performed together with the switching of the heat application intensity of the electric heater 2 and the switching of the state of the electric heater 2 between the on-state and the off-state.

Fourth Example Embodiment

In some cases, the rated current of the DC/DC converter 3 can be higher while the temperature $T_{32}$ of the converter coolant 32 is low than while the temperature $T_{32}$ is high.

In such a case, the DC/DC converter 3 may be sufficiently cooled by decreasing the heat application intensity of the electric heater 2 and decreasing the value of the current outputted from the DC/DC converter 3 even without switching the state of the electric heater 2 from the on-state to the off-state in some cases.

Therefore, in such a case, the controller 4 may perform a control of switching the heat application intensity of the electric heater 2 without turning off the electric heater 2 in accordance with the temperature $T_{32}$ of the converter coolant 32, for example, in a case where the temperature $T_{32}$ of the converter coolant 32 is low.

Figure 5:
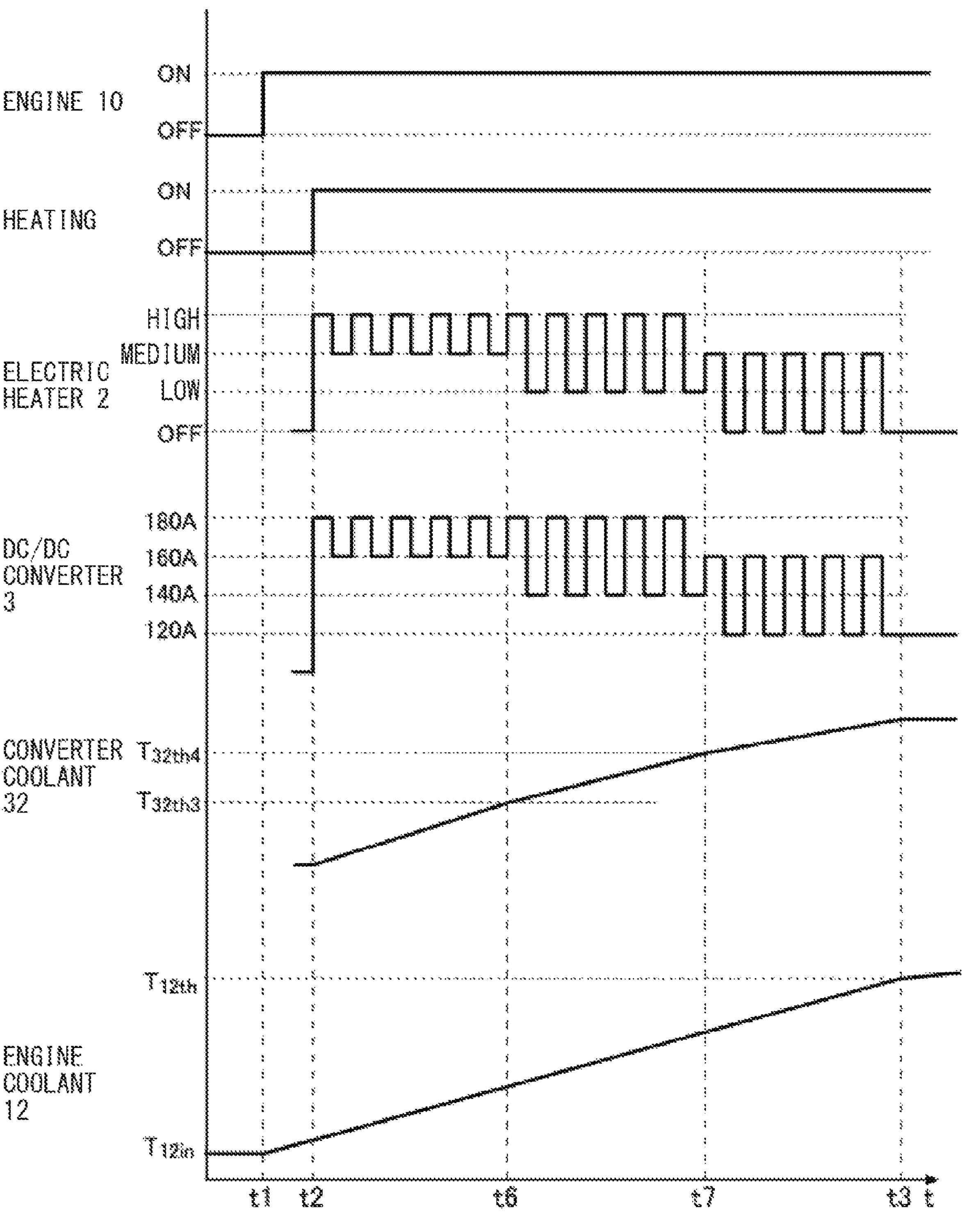
FIG. 5 is a timing chart for describing a way of controlling, etc. according to one example embodiment.

For example, as illustrated in FIG. 5, while the temperature $T_{32}$ of the converter coolant 32 is low, the controller 4 may switch the heat application intensity of the electric heater 2 between the high level and the medium level. That is, in FIG. 5, the controller 4 may switch the heat application intensity of the electric heater 2 between the high level and the medium level in a period from a time t2 to a time t6 in which the temperature $T_{32}$ of the converter coolant 32 is less than or equal to the predetermined temperature $T_{32th3}$.

At a timing (a time t6) when the temperature $T_{32}$ of the converter coolant 32 increases and reaches the predetermined temperature $T_{32th3}$, the controller 4 may change the way of control to a control of switching the heat application intensity of the electric heater 2 between the high level and the low level. In such a manner, the controller 4 may perform a control of switching the heat application intensity without turning off the electric heater 2 in the case where the temperature $T_{32}$ of the converter coolant 32 is low.

At a timing (a time t7) when the temperature $T_{32}$ of the converter coolant 32 further increases and reaches the predetermined temperature $T_{32th4}$, the controller 4 may change the way of control to a control of switching the state of the electric heater 2 between the on-state and the off-state. In this case, for example, the heat application intensity of the electric heater 2 for the on-state may be the medium level. However, this is non-limiting, and the heat application intensity of the electric heater 2 for the on-state may be set to the low level.

According to the fourth example embodiment, such a configuration makes it possible to allow the electric heater 2 to be left in the on-state and generate heat in a period where the electric heater 2 is turned off according to the third example embodiment, at least while the temperature $T_{32}$ of the converter coolant 32 is low.

It is thus possible to efficiently heat the air conditioning airflow by the electric heater 2 even in a case where the temperature of the engine 10 is low and the temperature of the air conditioning airflow blown out into the space in the vehicle compartment is low.

Fifth Example Embodiment

Described in the example embodiments above is a case where the switching of the state of the electric heater 2 between the on-state and the off-state and the switching of the heat application intensity may be performed until the temperature $T_{12}$ of the engine coolant 12 reaches, for example, the predetermined temperature $T_{12th}$.

However, depending on the current value of the direct current outputted from the DC/DC converter 3, the switching of the state of the electric heater 2 between the on-state and the off-state and the switching of the heat application intensity may be stopped before the temperature $T_{12}$ of the engine coolant 12 reaches, for example, the predetermined temperature $T_{12th}$ in some cases.

Here, for example, consider a case where the control is performed in a similar manner to the control of switching the state of the electric heater 2 between the on-state and the off-state and switching the heat application intensity as illustrated in FIG. 5.

It is to be noted that although FIG. 5 illustrates a case where the value of the current outputted from the DC/DC converter 3 to the other electric load 5 is 120 A, considered here is an example case where the value of the current outputted from the DC/DC converter 3 to the other electric load 5 is 80 A. In the considered case, as with the cases described above, the values of the consumed currents may be 60 A, 40 A, and 20 A in the cases where the heat application intensity of the electric heater 2 are at the high level, the medium level, and the low level, respectively. In addition, the rated current and the rated short-time current of the DC/DC converter 3 may be 120 A and 190 A, respectively, as with the cases described above.

Figure 6A:
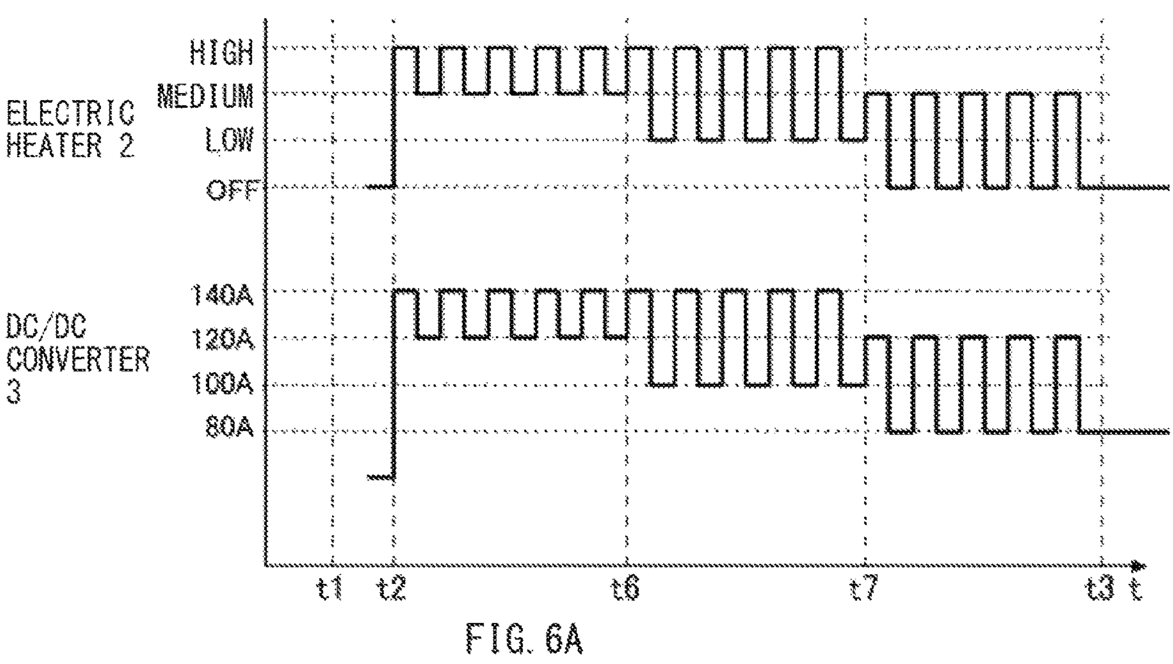
FIG. 6A is a timing chart for describing a way of controlling, etc. according to one example embodiment.

In this case, if the control is performed in a similar manner to the control in the case illustrated in FIG. 5, the controller 4 may switch the heat application intensity of the electric heater 2 between the high level and the medium level in a period from a time t2 to a time t6, as illustrated in FIG. 6A.

In this case, while the heat application intensity of the electric heater 2 is at the high level, the value of the current outputted from the DC/DC converter 3 to the electric heater 2 may be 60 A, and the value of the current outputted from the DC/DC converter 3 to the other electric load 5 may be 80 A. Accordingly, the DC/DC converter 3 may output the short-time current of 140 A.

While the heat application intensity of the electric heater 2 is at the medium level, the value of the current that is outputted from the DC/DC converter 3 to the electric heater 2 may be 40 A. Accordingly, the DC/DC converter 3 may output the steady-state current of 120 A.

Thus, the DC/DC converter 3 may output the steady-state current of 120 A after outputting the short-time current of 140 A.

In other words, in this case, if the heat application intensity of the electric heater 2 is at the medium level, the direct current outputted from the DC/DC converter 3 may be the steady-state current. Therefore, decreasing the heat application intensity of the electric heater 2 to the medium level may be sufficient.

If the decreasing of the heat application intensity of the electric heater 2 to the medium level does not change the direct current outputted from the DC/DC converter 3 to the steady-state current, the heat application intensity of the electric heater 2 may be to be decreased to the low level or the electric heater 2 may be to be turned off.

Thereafter, as illustrated in FIG. 6A, if the heat application intensity of the electric heater 2 is switched between the high level and the low level in a period from the time t6 to a time t7, the value of the current outputted from the DC/DC converter 3 to the electric heater 2 may increase and decrease between 60 A and 20 A in this case.

Assume that the average value of the values of the currents outputted from the DC/DC converter 3 to the electric heater 2 in the period from the time t6 to the time t7 is, for example, 40 A in this case. Such an average value may be substantially equal to the value of the current to be outputted from the DC/DC converter 3 to the electric heater 2 in a case where the heat application intensity of the electric heater 2 is set to the medium level.

In this case, the DC/DC converter 3 may output a current of 80 A to the other electric load 5. Accordingly, the DC/DC converter 3 may output a current of 120 A in average to the electric heater 2 and the other electric load 5.

The current value of this current is less than or equal to the current value of the rated current. Therefore, it may be sufficient that the DC/DC converter 3 outputs the steady-state current of 120 A in this case.

Figure 6B:
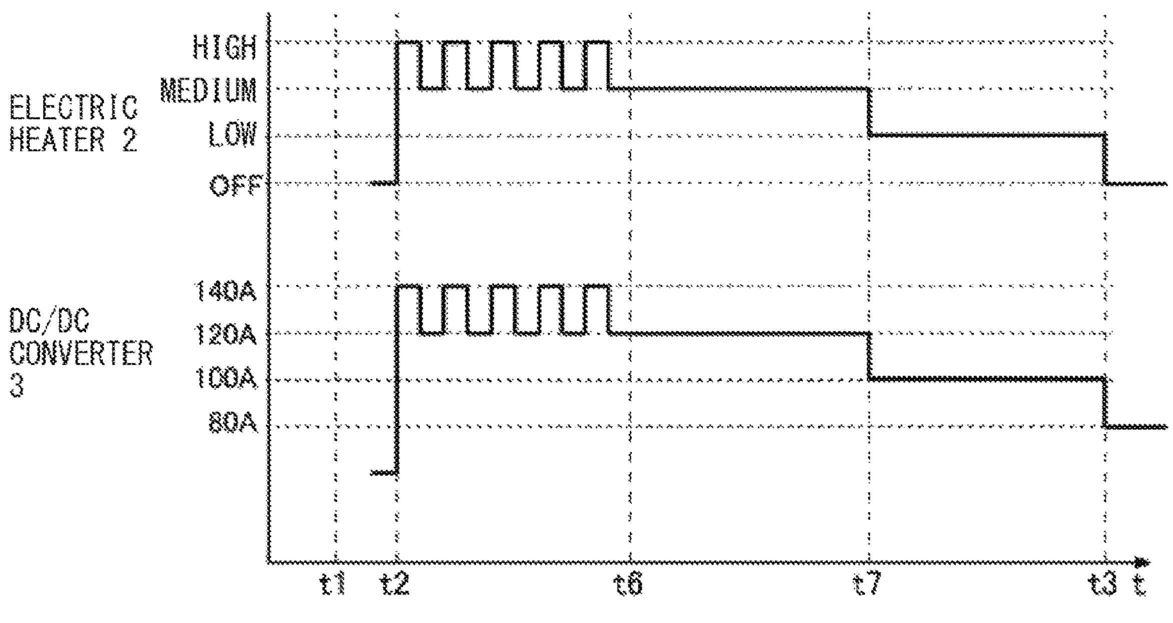
FIG. 6B is a timing chart for describing a way of controlling, etc. according to one example embodiment.

Accordingly, it is possible to achieve substantially the same working of heating also in a case where the heat application intensity of the electric heater 2 is set to the medium level in the period from the time t6 to the time t7 as illustrated in FIG. 6B, instead of switching the heat application intensity of the electric heater 2 between the high level and the low level in the period from the time t6 to the time t7 as illustrated in FIG. 6A.

In addition, in this case, it may be sufficient that the DC/DC converter 3 outputs the steady-state current of 120 A and the DC/DC converter 3 may not be to output the short-time current.

Thus, in the above-described case, the controller 4 may switch the heat application intensity of the electric heater 2 between the high level and the medium level in the period from the time t2 to the time t6, but may stop the switching of the heat application intensity of the electric heater 2 at and after the time t6.

That is, it is possible to stop the switching of the heat application intensity of the electric heater 2 before the temperature $T_{12}$ of the engine coolant 12 reaches the predetermined temperature $T_{12th}$ at the time t3.

FIG. 6B illustrates a case where the heat application intensity of the electric heater 2 may be left at the low level also in a period from a time t7 to a time t3 instead of performing the control of switching the state of the electric heater 2 between the on-state and the off-state as illustrated in FIG. 6A, for a reason similar to that described above.

Sixth Example Embodiment

As described above, the above-described control by the vehicle air conditioning control system 1 may be to assist the heating with use of the electric heater 2 in a case where the temperature of the engine 10 is low and the temperature of the air conditioning airflow blown out from the air conditioning equipment already provided in the vehicle is low.

In addition, the DC/DC converter 3 may generate heat while operating and the exhaust heat from the DC/DC converter 3 may be absorbed by the converter coolant 32. This may increase the temperature $T_{32}$ of the converter coolant 32.

If it is possible to heat the engine 10 by utilizing the exhaust heat from the DC/DC converter 3, it is possible to increase, at an earlier timing, the temperature of the air conditioning airflow blown out from the air conditioning equipment.

Accordingly, the engine cooling system 11 configured to cool the engine 10 and the converter cooling system 31 configured to cool the DC/DC converter 3 may be configured as substantially the same cooling system.

Figure 7:
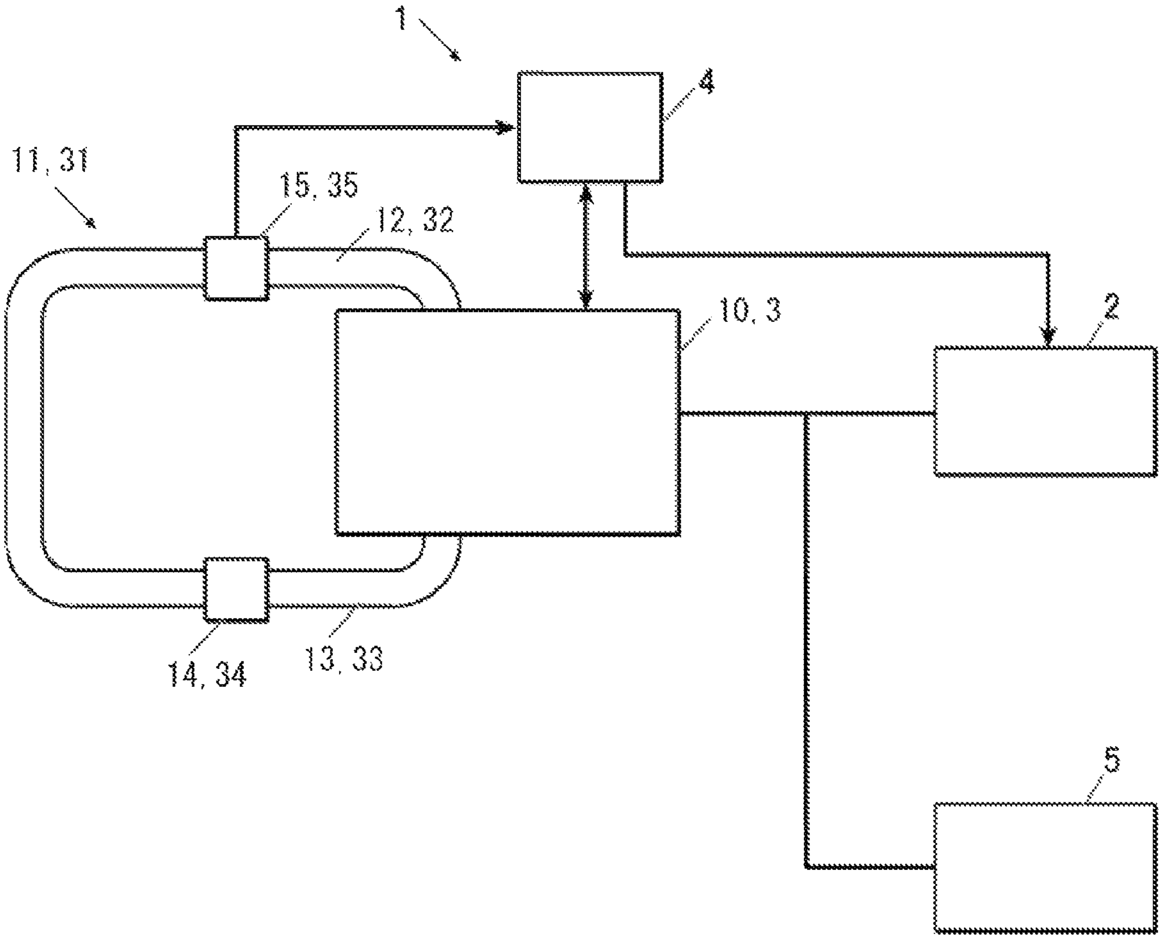
FIG. 7 is a schematic diagram illustrating a configuration of a vehicle air conditioning control system according to one example embodiment.

That is, both the engine 10 and the DC/DC converter 3 may be cooled by a single cooling system. FIG. 7 is a diagram illustrating such a configuration of the vehicle air conditioning control system 1.

The components included in the vehicle air conditioning control system 1 according to the sixth example embodiment may be substantially the same as those illustrated in FIG. 1, and a description thereof is therefore omitted. According to the sixth example embodiment, the engine cooling system 11 may also serve as the converter cooling system 31. The engine system temperature sensor 15 may also serve as the converter system temperature sensor 35.

With such a configuration, the exhaust heat from the DC/DC converter 3 may be absorbed by the engine coolant 12.

Figure 8:
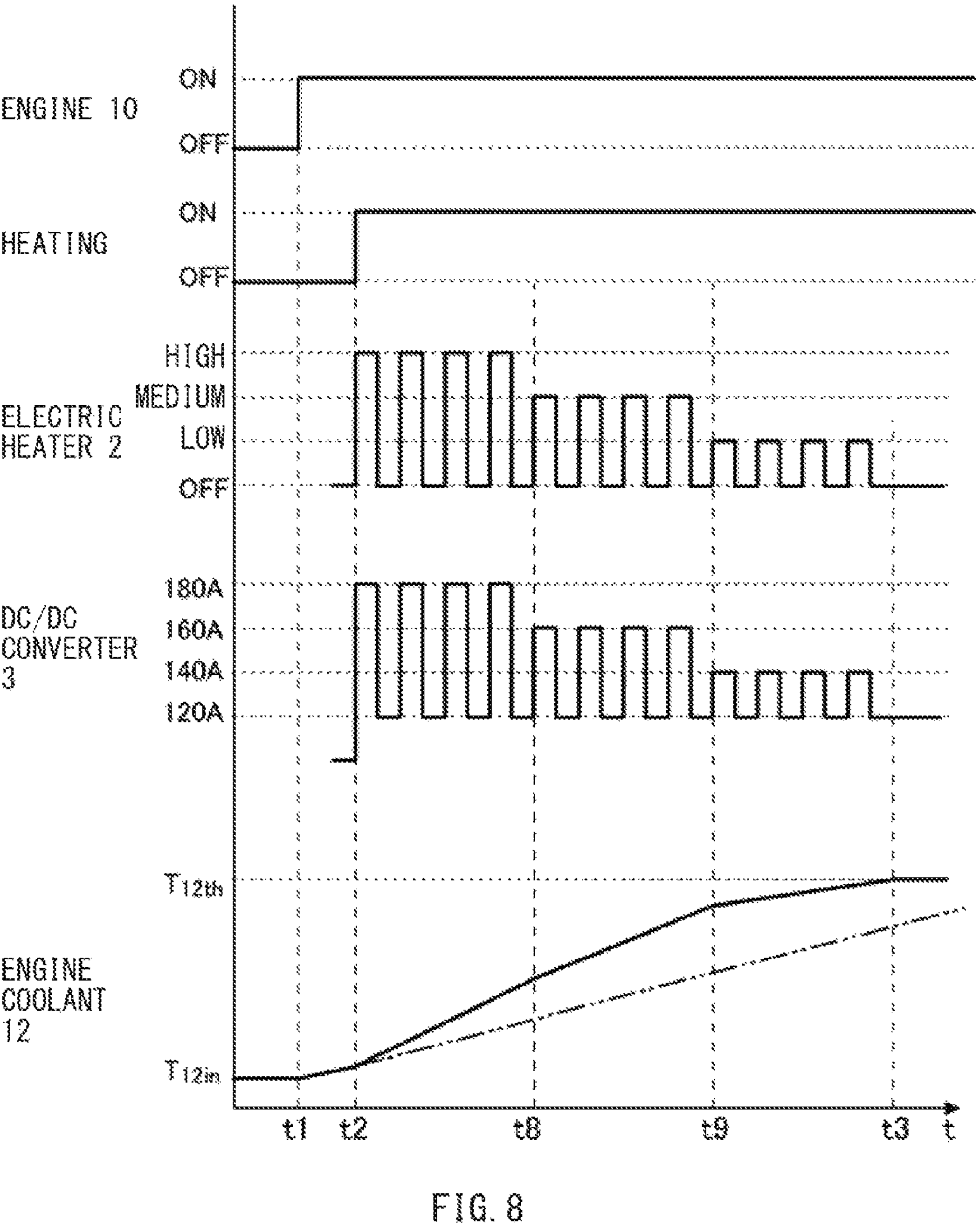
FIG. 8 is a timing chart for describing that the temperature of an engine coolant increases more rapidly according to one example embodiment, etc.

Accordingly, as indicated by a solid line in FIG. 8, the temperature $T_{12}$ of the engine coolant 12 may increase more rapidly as compared with a case where the cooling system for the engine 10 and the cooling system for the DC/DC converter 3 are provided separately from each other. The case where the cooling system for the engine 10 and the cooling system for the DC/DC converter 3 are provided separately from each other is indicated by a dash-dot-dot-dash line in FIG. 8.

The increase in the temperature of the engine coolant 12 may rapidly heat the component such as the engine 10. As a result, the temperature of the air conditioning airflow blown out from the air conditioning equipment into the space in the vehicle compartment may increase rapidly.

In addition, because the temperature $T_{12}$ of the engine coolant 12 reaches the predetermined temperature $T_{12th}$ at an earlier timing, it is possible to end the control by the vehicle air conditioning control system 1 in a shorter time, as compared with the case where the cooling system for the engine 10 and the cooling system for the DC/DC converter 3 are provided separately from each other.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, although the description is given of the case where the engine system temperature sensor 15 measures the temperature $T_{12}$ of the engine coolant 12 in the example embodiments above; this is non-limiting. Any device may be used as long as the device is able to measure the temperature of the engine 10 and the temperatures of other members accompanying associated to the engine 10.

In addition, the converter system temperature sensor 35 may be any device that measures the temperature of the member related to cooling of the DC/DC converter 3 and may not be limitedly used in a case of measuring the temperature $T_{32}$ of the converter coolant 32.

The controller 4 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 4 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 4 illustrated in FIG. 1.

The invention claimed is:

1. A vehicle air conditioning control system comprising:

an electric heater configured to apply heat to an air conditioning airflow to be blown out into a space in a vehicle compartment;

a direct-current-to-direct-current converter configured to convert a voltage of electric power from an in-vehicle battery into a predetermined voltage;

an engine system temperature sensor configured to measure a temperature of at least one of an engine or a member related to the engine;

a converter system temperature sensor configured to measure a temperature of a member related to cooling of the direct-current-to-direct-current converter; and a controller configured to control an operating state of the electric heater based on the temperature measured by the engine system temperature sensor, wherein the direct-current-to-direct-current converter is configured to output either a steady-state current or a short-time current, the short-time current having a current value higher than a current value of the steady-state current and being output for a predetermined time period or less, and the controller is configured to, upon determining, based on the temperature, that the electric heater is to operate, switch the operating state between a first operating state and a second operating state, the first operating state being an operating state in which the electric heater is turned on and the direct-current-to-direct-current converter is caused to output the short-time current, the second operating state being an operating state in which the electric heater is turned off and the direct-current-to-direct-current converter is caused to output the steady-state current, and the controller is further configured to change a time period depending on the temperature measured by the converter system temperature sensor, the time period for which the electric heater is turned on.

2. The vehicle air conditioning control system according to claim 1, wherein the controller is configured to, upon starting control of the operating state, stop the control when the temperature measured by the engine system temperature sensor reaches a predetermined temperature.

3. The vehicle air conditioning control system according to claim 1, wherein the controller, when the electric heater is turned on and the current outputted from the direct-current-to-direct-current converter is less than or equal to a rated current, to leave the electric heater in an on-state without switching the state of the electric heater between an on-state and an off-state.

4. The vehicle air conditioning control system according to claim 1, wherein the electric heater is configured to have a heat application intensity that is switchable, and the controller is configured to switch a state of the electric heater between an on-state and an off-state and switching of the heat application intensity.

5. The vehicle air conditioning control system according to claim 4, further comprising a converter system temperature sensor configured to measure a temperature of a member related to cooling of the direct-current-to-direct-current converter, wherein the controller is configured to switch the state of the electric heater between the on-state and the off-state while switching the heat application intensity and thereby decrease, in accordance with an increase in the temperature measured by the converter system temperature sensor, the heat application intensity of the electric heater for the on-state.

6. The vehicle air conditioning control system according to claim 4, further comprising a converter system temperature sensor configured to measure a temperature of a member related to cooling of the direct-current-to-direct-current converter, wherein the controller is configured to, depending on the temperature measured by the converter system temperature sensor, switch the heat application intensity without turning off the electric heater.

7. The vehicle air conditioning control system according to claim 1, wherein an engine cooling system and a converter cooling system are configured as a same cooling system, the engine cooling system being configured to cool the engine, the converter cooling system being configured to cool the direct-current-to-direct-current converter.

8. The vehicle air conditioning control system according to claim 2, wherein an engine cooling system and a converter cooling system are configured as a same cooling system, the engine cooling system being configured to cool the engine, the converter cooling system being configured to cool the direct-current-to-direct-current converter.

9. The vehicle air conditioning control system according to claim 1, wherein an engine cooling system and a converter cooling system are configured as a same cooling system, the engine cooling system being configured to cool the engine, the converter cooling system being configured to cool the direct-current-to-direct-current converter.

10. The vehicle air conditioning control system according to claim 3, wherein an engine cooling system and a converter cooling system are configured as a same cooling system, the engine cooling system being configured to cool the engine, the converter cooling system being configured to cool the direct-current-to-direct-current converter.

11. The vehicle air conditioning control system according to claim 4, wherein an engine cooling system and a converter cooling system are configured as a same cooling system, the engine cooling system being configured to cool the engine, the converter cooling system being configured to cool the direct-current-to-direct-current converter.

12. The vehicle air conditioning control system according to claim 5, wherein an engine cooling system and a converter cooling system are configured as a same cooling system, the engine cooling system being configured to cool the engine, the converter cooling system being configured to cool the direct-current-to-direct-current converter.

13. The vehicle air conditioning control system according to claim 7, wherein the engine system temperature sensor is configured to also serve as a converter system temperature sensor configured to measure a temperature of a member related to cooling of the direct-current-to-direct-current converter.

14. The vehicle air conditioning control system according to claim 8, wherein the engine system temperature sensor is configured to also serve as a converter system temperature sensor configured to measure a temperature of a member related to cooling of the direct-current-to-direct-current converter.

15. The vehicle air conditioning control system according to claim 9, wherein the engine system temperature sensor is configured to also serve as a converter system temperature sensor configured to measure a temperature of a member related to cooling of the direct-current-to-direct-current converter.

16. The vehicle air conditioning control system according to claim 10, wherein the engine system temperature sensor is configured to also serve as a converter system temperature sensor configured to measure a temperature of a member related to cooling of the direct-current-to-direct-current converter.

17. The vehicle air conditioning control system according to claim 11, wherein the engine system temperature sensor is configured to also serve as a converter system temperature sensor configured to measure a temperature of a member related to cooling of the direct-current-to-direct-current converter.

18. The vehicle air conditioning control system according to claim 12, wherein the engine system temperature sensor is configured to also serve as a converter system temperature sensor configured to measure a temperature of a member related to cooling of the direct-current-to-direct-current converter.

* * * * *